United States Patent
Soleimani Kheibari

(10) Patent No.: US 12,187,885 B2
(45) Date of Patent: Jan. 7, 2025

(54) WATERBORNE COATING COMPOSITIONS

(71) Applicant: BASF SE, Ludwigshafen am Rhein (DE)

(72) Inventor: Mohsen Soleimani Kheibari, Wyandotte, MI (US)

(73) Assignee: BASF SE (DE)

( * ) Notice: Subject to any disclaimer, the term of this patent is extended or adjusted under 35 U.S.C. 154(b) by 742 days.

(21) Appl. No.: 17/295,341

(22) PCT Filed: Nov. 18, 2019

(86) PCT No.: PCT/US2019/061989
§ 371 (c)(1),
(2) Date: May 19, 2021

(87) PCT Pub. No.: WO2020/106613
PCT Pub. Date: May 28, 2020

(65) Prior Publication Data
US 2021/0388195 A1 Dec. 16, 2021

Related U.S. Application Data

(60) Provisional application No. 62/769,633, filed on Nov. 20, 2018.

(51) Int. Cl.
| | | |
|---|---|---|
| *C08L 33/08* | (2006.01) | |
| *C08F 2/22* | (2006.01) | |
| *C08F 212/08* | (2006.01) | |
| *C08F 220/06* | (2006.01) | |
| *C08F 220/14* | (2006.01) | |
| *C08F 220/18* | (2006.01) | |
| *C08F 220/28* | (2006.01) | |
| *C08F 220/56* | (2006.01) | |
| *C08G 59/22* | (2006.01) | |
| *C08G 59/24* | (2006.01) | |
| *C08K 3/22* | (2006.01) | |
| *C08K 5/00* | (2006.01) | |
| *C08K 5/17* | (2006.01) | |
| *C09D 5/02* | (2006.01) | |
| *C09D 133/08* | (2006.01) | |

(52) U.S. Cl.
CPC ............ *C08L 33/08* (2013.01); *C08F 2/22* (2013.01); *C08F 212/08* (2013.01); *C08F 220/06* (2013.01); *C08F 220/14* (2013.01); *C08F 220/1804* (2020.02); *C08F 220/1808* (2020.02); *C08F 220/283* (2020.02); *C08F 220/56* (2013.01); *C08G 59/223* (2013.01); *C08G 59/226* (2013.01); *C08G 59/245* (2013.01); *C08K 3/22* (2013.01); *C08K 5/0025* (2013.01); *C08K 5/17* (2013.01); *C08L 2201/52* (2013.01); *C08L 2201/54* (2013.01); *C08L 2205/025* (2013.01); *C09D 5/02* (2013.01); *C09D 133/08* (2013.01)

(58) Field of Classification Search
CPC .. C08L 33/08; C08L 2201/52; C08L 2201/54; C08L 2205/025; C08F 2/22; C08F 212/08; C08F 220/06; C08F 220/14; C08F 220/1804; C08F 220/1808; C08F 220/283; C08F 220/56; C08G 59/223; C08G 59/226; C08G 59/245; C08K 3/22; C08K 5/0025; C08K 5/17; C08D 5/02; C08D 133/08
See application file for complete search history.

(56) References Cited

U.S. PATENT DOCUMENTS

| | | |
|---|---|---|
| 546,160 A | 9/1895 | Kimball |
| 4,414,370 A | 11/1983 | Hamielec et al. |
| 4,529,787 A | 7/1985 | Schmidt et al. |
| 2009/0312469 A1 | 12/2009 | Koziski et al. |

FOREIGN PATENT DOCUMENTS

| | | |
|---|---|---|
| CN | 101613513 A | 12/2009 |
| CN | 101842417 A | 9/2010 |
| EP | 2133375 A1 | 12/2009 |
| WO | 2009/018264 A2 | 2/2009 |
| WO | 2018/075656 A1 | 4/2018 |

OTHER PUBLICATIONS

International Preliminary Report on Patentability received for PCT Patent Application No. PCT/US2019/061989, mailed on Jun. 3, 2021, 14 pages.
International Search Report and Written Opinion received for PCT Patent Application No. PCT/US2019/061989, mailed on Jul. 20, 2020, 17 pages.
Invitation to Pay Additional Fees received for PCT Patent Application No. PCT/US2019/061989, mailed on May 28, 2020, 15 pages.

*Primary Examiner* — Ling Siu Choi
*Assistant Examiner* — Andrea Wu
(74) *Attorney, Agent, or Firm* — Faegre Drinker Biddle & Reath LLP

(57) ABSTRACT

A dispersion includes a hyperbranched polymer having latent crosslinking functionality and comprising the reaction product of: a partially neutralized, acid-functional resin; and an epoxy; and optionally, an effective amount of a cross-linking agent; wherein: the partially neutralized, acid-functional resin comprises the reaction product of a mixture of: a first acid-functional resin with a base and a second acid-functional resin; or a first and a second acid-functional resin with a base; the first acid-functional resin is not the same as the second acid-functional resin; at least one of the acid functional resins comprises a further functional group capable of Schiff-Base crosslinking after film formation; and the dispersion is a single pack waterborne polymer dispersion.

14 Claims, No Drawings

WATERBORNE COATING COMPOSITIONS

CROSS-REFERENCE TO RELATED APPLICATIONS

This application is a national stage application (under 35 U.S.C. § 371) of PCT/US2019/061989, filed Nov. 18, 2019, which claims benefit of U.S. Application No. 62/769,633, filed Nov. 20, 2018, both of which are incorporated herein by reference in their entirety.

FIELD

In general, the present technology relates to the field of water-based polymer dispersions. More specifically, the present technology relates to the field of water-based microgel polymer dispersions of acid functional resins, where the acid functional resins are at least partially neutralized and then reacted with an epoxy, and methods of making and using such materials.

SUMMARY

In one aspect, a dispersion is provided, the dispersion containing:
a hyperbranched polymer having latent crosslinking functionality and comprising the reaction product of:
a partially neutralized, acid-functional resin; and
an epoxy; and
optionally, an effective amount of a crosslinking agent;
wherein:
the partially neutralized, acid-functional resin comprises the reaction product of a mixture of:
a first acid-functional resin with a base and a second acid-functional resin; or
a first and a second acid-functional resin with a base;
the first acid-functional resin is not the same as the second acid-functional resin;
at least one of the acid functional resins comprises a further functional group capable of Schiff-Base crosslinking after film formation; and
the dispersion is a single pack waterborne polymer dispersion.
In another aspect, an aqueous dispersion comprises:
a polymer having latent crosslinking functionality and comprising the reaction product of:
a partially neutralized, acid-functional resin; and
an epoxy; and
optionally, an effective amount of a crosslinking agent;
wherein:
the partially neutralized, acid-functional resin comprises the reaction product of a mixture of:
a first acid-functional resin and an emulsion-polymerized reaction mixture with a base;
the emulsion-polymerized reaction mixture comprises:
about 1 wt % to about 25 wt % of a monomer having latent crosslinking functionality;
about 0.5 wt % to about 15 wt % of an acid functional monomer; and
about 60 wt % to about 98.5 wt % of at least one other copolymerizable monomer,
at least one of the acid functional resins comprises a further functional group capable of Schiff-Base crosslinking after film formation; and
the dispersion is a single pack waterborne polymer dispersion.

In any of the above embodiments, the base is $NH_3$, $NH_{3\,(aq)}$, NaOH, KOH, or a mixture of any two or more thereof. In some embodiments, at least about 5 mol % of acid groups on the acid-functional resin are neutralized. In any of the above embodiments, from about 5 mol % to about 95 mol % of acid groups on the acid-functional resin are bonded to the epoxy. In any of the above embodiments, the first and second acid-functional resins are individually an acid functional acrylic resin, a styrene-acrylic resin, a non-acrylic acid functional resin, and a hybrid acrylic acid-functional resin.

In any of the above embodiments, the first and second acid-functional resins individually comprise one or more polymerized monomers selected from the group consisting of 2-hydroxyethyl acrylate, 2-hydroxyethyl methacrylate, 2,3-hydroxypropyl acrylate, 2,3-hydroxypropyl methacrylate, 2,4-hydroxybutyl acrylate, 2,4-hydroxybutyl methacrylates, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate.

In any of the above embodiments, the first and second acid-functional resins individually comprise one or more polymerized monomers selected from the group consisting of vinylbenzoic acid, crotonic acid, itaconic acid, sorbic acid, cinnamic acid, citraconic acid, chloroacrylic acid, mesaconic acid, maleic acid, fumaric acid, ethacrylic acid, acrylic acid, methacrylic acid, sodium-2-sulfoethyl acrylate, sodium N-(1,1-dimethyl-2-sulfoethyl)acrylamide, and 3-acrylamido-3-methylbutanoic acid.

In any of the above embodiments, the epoxy comprises a plurality of epoxy groups. In some embodiments, the epoxy comprises a polyepoxy-functional polymer, a monoepoxy-functional polymer, or a mixture of any two or more thereof. In some embodiments, the dispersion further contains the polyepoxy-functional polymer, wherein the polyepoxy-functional polymer has an epoxy equivalent weight of about 100 grams/eq. to about 1000 grams/eq. In some embodiments, the dispersion contains the polyepoxy-functional polymer, wherein the polyepoxy-functional polymer comprises a glycidyl ester or ether polymer, a glycidyl amine polymer, a cyclohexanedimethanol diglycidyl ether polymer, a polypropylene oxide diglycidyl ether polymer, a bisphenol A diglycidyl ether polymer, a bisphenol F diglycidyl ether polymer, or a mixture of any two or more thereof. In some embodiments, the dispersion contains the monoepoxy-functional polymer, and the monoepoxy-functional polymer comprises a glycidyl ether polymer, a glycidyl ester polymer, a glycidyl amine polymer, a glycidyl ester polymer, or a mixture of any two or more thereof. In some embodiments, the monoepoxy-functional polymer comprises a glycidyl methacrylate, a glycidyl ester of neodecanoic acid, a bisphenol A monoglycidyl ether, a 2-ethylhexyl glycidyl ether, or a mixture of any two or more thereof. In some embodiments, the base is $NH_3$, or $NH_{3\,(aq)}$.

In some embodiments, the acid-functional resin comprises the polymerization product of a mixture of monomers comprising:
a styrenic monomer; and
a monomer of formula V, maleic anhydride, itaconic acid, an ester of itaconic acid, or a mixture of any two or more thereof;
wherein:

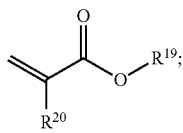

Formula V $R^{20}$ is hydrogen or $CH_3$; and
$R^{19}$ is a hydrogen, alkyl, cycloalkyl, aryl, or alkaryl.
In some embodiments, $R^{19}$ is a $C_1$-$C_{20}$ alkyl, a $C_3$-$C_{20}$ cycloalkyl, $C_5$-$C_{12}$ aryl, or a $C_5$-$C_{20}$ alkaryl. In some embodiments, the acid-functional resin has a number average molecular weight ($M_n$) of about 1000 g/mol to about 30,000 g/mol. In some embodiments, the acid-functional resin has a number average molecular weight ($M_n$) of about 2500 g/mol to about 20,000 g/mol. In some embodiments, the hyperbranched polymer has an acid number of about 15 mg KOH/g to about 300 mg KOH/g. In some embodiments, the hyperbranched polymer has an acid number of about 20 mg KOH/g to about 250 mg KOH/g. In some embodiments, the hyperbranched polymer is a microgel. In some embodiments, the further functional group is a carbonyl group. In some embodiments, the crosslinking agent is polyamines, a poly hydrazide, a hydrazine, or a mixture of any two or more thereof.

In another aspect, a printing ink, surface coating, or overprint varnish containing any one of the waterborne polymer dispersion described herein is provided.

In another aspect, a waterborne polymer dispersion is provided, the waterborne polymer containing, based on the total solids weight in the polymer dispersion,
about 1 wt % to about 99 wt %, on a solids basis, of a non-self-crosslinkable waterborne polymer dispersion; and
about 99 wt % to about 1 wt %, on a solids basis, of a self-crosslinkable waterborne polymer dispersion comprising:
a hyperbranched polymer having latent crosslinking functionality and comprising the reaction product of:
a partially neutralized, acid-functional resin; and
an epoxy; and
optionally, an effective amount of a crosslinking agent;
wherein:
the partially neutralized, acid-functional resin comprises the reaction product of a mixture of:
a first acid-functional resin with a base and a second acid-functional resin; or
a first and a second acid-functional resin with a base;
the first acid-functional resin is not the same as the second acid-functional resin;
at least one of the acid functional resins comprises a further functional group capable of Schiff-Base crosslinking after film formation.

In some embodiments, the waterborne polymer dispersion contains:
about 1 wt % to about 99 wt %, on a solids basis, of the self-crosslinkable waterborne polymer dispersion; and
about 99 wt % to about 1 wt %, on a solids basis, of the non-self-crosslinkable waterborne polymer dispersion.
In some embodiments, the waterborne polymer dispersion contains:
about 20 wt % to about 80 wt %, on a solids basis, of the self-crosslinkable waterborne polymer dispersion; and
about 80 wt % to about 20 wt %, on a solids basis, of the non-self-crosslinkable waterborne polymer dispersion.
In some embodiments, the waterborne polymer dispersion contains:
about 40 wt % to about 60 wt %, on a solids basis, of the self-crosslinkable waterborne polymer dispersion; and
about 60 wt % to about 40 wt %, on a solids basis, of the non-self-crosslinkable waterborne polymer dispersion.

In another aspect, a waterborne polymer dispersion is provided, the waterborne polymer dispersion containing a partially neutralized, acid functional latex and water;
wherein:
the partially neutralized, acid functional latex is the reaction product of an emulsion-polymerized reaction mixture and an epoxy compound; and
the emulsion-polymerized reaction mixture comprises:
about 1 wt % to about 25 wt % of a monomer having latent crosslinking functionality;
about 0.5 wt % to about 15 wt % of an acid functional monomer; and
about 60 wt % to about 98.5 wt % of at least one other copolymerizable monomer.

In some embodiments, the partially neutralized, acid functional latex is a microgel. In some embodiments, the latent crosslinking functionality comprises carbonyl groups. In some embodiments, the waterborne polymer dispersion further contains a crosslinking agent selected from the group consisting of polyamines, polyhydrazides, polyhydrazines, and a mixture of any two or more thereof. In some embodiments, the emulsion-polymerized reaction mixture is partially neutralized with $NH_3$, $NH_{3\ (aq)}$, NaOH, KOH, or a mixture of any two or more thereof. In some embodiments, at least about 5 mol % of the acid groups on the latex are neutralized. In some embodiments, up to about 95 mol % of the acid groups on the latex are bonded to the epoxy. In some embodiments, the latex comprises an acid functional acrylic resin, a styrene-acrylic resin, a non-acrylic acid functional resin, a hybrid acrylic acid-functional resin, or a mixture of any two or more thereof.

In some embodiments, the latex comprises one or more copolymerizable monomers selected from the group consisting of 2-hydroxyethyl acrylate, 2-hydroxyethyl methacrylate, 2,3-hydroxypropyl acrylate, 2,3-hydroxypropyl methacrylate, 2,4-hydroxybutyl acrylate, 2,4-hydroxybutyl methacrylates, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate.

In some embodiments, the acid-functional monomer is selected from the group consisting of vinylbenzoic acid, crotonic acid, itaconic acid, sorbic acid, cinnamic acid, citraconic acid, chloroacrylic acid, mesaconic acid, maleic acid, fumaric acid, ethacrylic acid, acrylic acid, methacrylic acid, sodium-2-sulfoethyl acrylate, sodium N-(1,1-dimethyl-2-sulfoethyl)acrylamide, and 3-acrylamido-3-methylbutanoic acid. In some embodiments, the epoxy comprises a polyepoxy-functional polymer, a monoepoxy-functional polymer, or a combination thereof. In some embodiments, the polyepoxy-functional polymer has an epoxy equivalent weight of about 100 grams/eq. to about 1000 grams/eq. In some embodiments, the water borne polymer dispersion contains the polyepoxy-functional polymer, wherein the polyepoxy-functional polymer comprises a glycidyl ester or ether polymer, a glycidyl amine polymer, a cyclohexanedimethanol diglycidyl ether polymer, a polypropylene oxide diglycidyl ether polymer, a bisphenol A diglycidyl ether polymer, a bisphenol F diglycidyl ether polymer, or a mixture of any two or more thereof. In some embodiments, the water borne polymer dispersion contains the monoepoxy-functional polymer, and the monoepoxy-functional polymer comprises a glycidyl ether polymer, a glycidyl ester polymer, a glycidyl amine polymer, a glycidyl ester polymer, or a mixture of any two or more thereof. In some embodiments, the monoepoxy-functional polymer contains a glycidyl methacrylate, a glycidyl ester of neodecanoic acid, a bisphenol A monoglycidyl ether, a 2-ethylhexyl glycidyl ether, or a mixture of any two or more thereof. In some embodiments, the polymer dispersion is neutralized with ammonia.

In some embodiments, the latex comprises the polymerization product of a mixture of monomers comprising:
  a styrenic monomer; and
  a monomer of formula V, maleic anhydride, itaconic acid, an ester of itaconic acid, or a mixture of any two or more thereof;
  wherein:
  ;
  $R^{20}$ is hydrogen or $CH_3$; and
  $R^{19}$ is a hydrogen, alkyl, cycloalkyl, aryl, or alkaryl.

In some embodiments, $R^{19}$ is a $C_1$-$C_{20}$ alkyl, a $C_3$-$C_{20}$ cycloalkyl, $C_5$-$C_{12}$ aryl, or a $C_5$-$C_{20}$ alkaryl. In some embodiments, the latex has a number average molecular weight ($M_n$) of about 1000 g/mol to about 100,000 g/mol. In some embodiments, the latex has a number average molecular weight ($M_n$) of about 1000 g/mol to about 10,000 g/mol. In some embodiments, the latex has a number average molecular weight ($M_n$) of about 2500 g/mol up to about 20,000 g/mol. In some embodiments, the functionalized latex has an acid number of about 15 mg KOH/g to about 300 mg KOH/g. In some embodiments, the functionalized latex has an acid number of about 20 mg KOH/g to about 250 mg KOH/g.

In another aspect, a printing ink, surface coating, or overprint varnish containing any one of the waterborne polymer dispersion described herein is provided.

In another aspect, a waterborne polymer dispersion is provided, the waterborne polymer dispersion containing, based on the total solids weight in the polymer dispersion;
  from about 1 wt % to about 99 wt % of a latent crosslinkable functionalized latex; and
  from about 99 wt % to about 1 wt % of a hyperbranched polymer having latent crosslinking functionality;
  wherein:
    the hyperbranched polymer comprises the reaction product of:
      two or more acid-functional resins; and
      an epoxy;
    the hyperbranched polymer comprises a functional group amenable to participate in Schiff-Base crosslinking after film formation;
    the latent crosslinkable functionalized latex comprises water and a partially neutralized, acid functional latex that is the reaction product of an emulsion-polymerized reaction mixture comprising:
      about 1 wt % to about 25 wt % of a monomer having latent crosslinking functionality;
      about 0.5 wt % to about 15 wt % of an acid functional monomer;
      an epoxy compound; and
      about 60 wt % to about 98.5 wt % of at least one other copolymerizable monomer.

In some embodiments, the latent crosslinkable functionalized latex comprises one or more polymerized acid functional monomers selected from the group consisting of vinylbenzoic acid, crotonic acid, itaconic acid, sorbic acid, cinnamic acid, citraconic acid, chloroacrylic acid, mesaconic acid, maleic acid, fumaric acid, ethacrylic acid, acrylic acid, methacrylic acid, sodium-2-sulfoethyl acrylate, sodium N-(1,1-dimethyl-2-sulfoethyl)acrylamide, and 3-acrylamido-3-methylbutanoic acid. In some embodiments, the waterborne polymer dispersion contains component from about 10 wt % to about 90 wt % of the latent cross linkable functionalized latex and from about 90 wt % to about 10 wt % of the hyperbranched polymer having latent crosslinking functionality. In some embodiments, the waterborne polymer dispersion contains from about 20 wt % to about 80 wt % of the latent cross linkable functionalized latex and from about 80 wt % to about 20 wt % of the hyperbranched polymer having latent crosslinking functionality. In some embodiments, the waterborne polymer dispersion contains from about 40 wt % to about 60 wt % of the latent cross linkable functionalized latex and from about 60 wt % to about 40 wt % of the hyperbranched polymer having latent crosslinking functionality.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% or up to plus or minus 5% of the stated value.

As used herein, "functional groups" includes, but is not limited to, halides, alcohols, ethers, carbonyls (including aldehydes, ketones, and carboxyl groups), amines, amides, cyanos, ureas, thiols, and combinations of two or more thereof. In some embodiments, the functional groups may include one or more carboxyl, hydroxyl, amino, uredo, acetoacetoxy, or diacetone group, or mixtures of two or more thereof.

As will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

The number average molecular weight ($M_n$) is the statistical average molecular weight of all the polymer chains in the polymer and is defined by:

$$M_n = (\Sigma N_i M_i)/\Sigma N_i$$

where $M_i$ is the molecular weight of a chain and $N_i$ is the number of chains of that molecular weight.

The weight average molecular weight ($M_w$) is defined by:

$$M_w = (\Sigma N_i M_i^2)/\Sigma N_i$$

Compared to Mn, Mw takes into account the molecular weight of a chain in determining contributions to the molecular weight average. The more massive the chain, the more the chain contributes to Mw.

Higher average molecular weights ($M_z$) can be defined by the equation:

$$M_z = (\Sigma N_i M_i^3)/\Sigma N_i$$

The dispersity index or polydispersity index (PDI) is a measure of the distribution of molecular mass in a given polymer sample. PDI of a polymer is calculated:

$$PDI = M_w/M_n$$

where the weight average molecular weight and the statistical average molecular weight are defined above.

In general, as used herein, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. An aryl group with one or more alkyl groups may also be referred to as alkaryl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Heterocyclyl or heterocycle refers to both aromatic and nonaromatic ring compounds including monocyclic, bicyclic, and polycyclic ring compounds containing 3 or more ring members of which one or more is a heteroatom such as, but not limited to, N, O, and S. Examples of heterocyclyl groups include, but are not limited to: unsaturated 3 to 8 membered rings containing 1 to 4 nitrogen atoms such as, but not limited to pyrrolyl, pyrrolinyl, imidazolyl, pyrazolyl, pyridinyl, dihydropyridinyl, pyrimidinyl, pyrazinyl, pyridazinyl, triazolyl (e.g. 4H-1,2,4-triazolyl, 1H-1,2,3-triazolyl, 2H-1,2,3-triazolyl etc.), tetrazolyl, (e.g. 1H-tetrazolyl, 2H tetrazolyl, etc.); saturated 3 to 8 membered rings containing 1 to 4 nitrogen atoms such as, but not limited to, pyrrolidinyl, imidazolidinyl, piperidinyl, piperazinyl; condensed unsaturated heterocyclic groups containing 1 to 4 nitrogen atoms such as, but not limited to, indolyl, isoindolyl, indolinyl, indolizinyl, benzimidazolyl, quinolyl, isoquinolyl, indazolyl, benzotriazolyl; unsaturated 3 to 8 membered rings containing 1 to 2 oxygen atoms and 1 to 3 nitrogen atoms such as, but not limited to, oxazolyl, isoxazolyl, oxadiazolyl (e.g. 1,2,4-oxadiazolyl, 1,3,4-oxadiazolyl, 1,2,5-oxadiazolyl, etc.); saturated 3 to 8 membered rings containing 1 to 2 oxygen atoms and 1 to 3 nitrogen atoms such as, but not limited to, morpholinyl; unsaturated condensed heterocyclic groups containing 1 to 2 oxygen atoms and 1 to 3 nitrogen atoms, for example, benzoxazolyl, benzoxadiazolyl, benzoxazinyl (e.g. 2H-1,4-benzoxazinyl etc.); unsaturated 3 to 8 membered rings containing 1 to 3 sulfur atoms and 1 to 3 nitrogen atoms such as, but not limited to, thiazolyl, isothiazolyl, thiadiazolyl (e.g. 1,2,3-thiadiazolyl, 1,2,4-thiadiazolyl, 1,3,4-thiadiazolyl, 1,2,5-thiadiazolyl, etc.); saturated 3 to 8 membered rings containing 1 to 2 sulfur atoms and 1 to 3 nitrogen atoms such as, but not limited to, thiazolodinyl; saturated and unsaturated 3 to 8 membered rings containing 1 to 2 sulfur atoms such as, but not limited to, thienyl, dihydrodithionyl, dihydrodithionyl, tetrahydrothiophene, tetrahydrothiopyran; unsaturated condensed heterocyclic rings containing 1 to 2 sulfur atoms and 1 to 3 nitrogen atoms such as, but not limited to, benzothiazolyl, benzothiadiazolyl, benzothiazinyl (e.g. 2H-1,4-benzothiazinyl, etc.), dihydrobenzothiazinyl (e.g. 2H-3,4-dihydrobenzothiazinyl, etc.), unsaturated 3 to 8 membered rings containing oxygen atoms such as, but not limited to furyl; unsaturated condensed heterocyclic rings containing 1 to 2 oxygen atoms such as benzodioxolyl (e.g., 1,3-benzodioxoyl, etc.); unsaturated 3 to 8 membered rings containing an oxygen atom and 1 to 2 sulfur atoms such as, but not limited to, dihydrooxathinyl; saturated 3 to 8 membered rings containing 1 to 2 oxygen atoms and 1 to 2 sulfur atoms such as 1,4-oxathiane; unsaturated condensed rings containing 1 to 2 sulfur atoms such as benzothienyl, benzodithinyl; and unsaturated condensed heterocyclic rings containing an oxygen atom and 1 to 2 oxygen atoms such as benzoxathinyl. Heterocyclyl group also include those described above in which one or more S atoms in the ring is double-bonded to one or two oxygen atoms (sulfoxides and sulfones). For example, heterocyclyl groups include tetrahydrothiophene oxide and tetrahydrothiophene 1,1-dioxide. Typical heterocyclyl groups contain 5 or 6 ring members. Thus, for example, heterocyclyl groups include morpholinyl, piperazinyl, piperidinyl, pyrrolidinyl, imidazolyl, pyrazolyl, 1,2,3-triazolyl, 1,2,4-triazolyl, tetrazolyl, thiophenyl, thiomorpholinyl, thiomorpholinyl in which the S atom of the thiomorpholinyl is bonded to one or more O atoms, pyrrolyl, pyridinyl homopiperazinyl, oxazolidin-2-onyl, pyrrolidin-2-onyl, oxazolyl, quinuclidinyl, thiazolyl, isoxazolyl, furanyl, dibenzylfuranyl, and tetrahydrofuranyl. Heterocyclyl or heterocycles may be substituted.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, dibenzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. Although the phrase "heteroaryl groups" includes fused ring compounds, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups may be substituted one or more times with various substituents such as those listed above.

Aralkyl groups are alkyl groups as defined above in which a hydrogen or carbon bond of an alkyl group is replaced with a bond to an aryl group as defined above. In some embodiments, aralkyl groups contain 7 to 16 carbon atoms, 7 to 14 carbon atoms, or 7 to 10 carbon atoms. Aralkyl groups may be substituted or unsubstituted. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanylethyl. Representative substituted aralkyl groups may be substituted one or more times with substituents such as those listed above.

The term "carboxyl" or "carboxylate" as used herein refers to a —C(O)OH group or to its ionized form, —C(O)O—.

The term "ester" as used herein refers to —C(O)OR$^{60}$ groups. R$^{60}$ is a substituted or unsubstituted alkyl, cycloalkyl, alkenyl, alkynyl, aryl, aralkyl, heterocyclylalkyl or heterocyclyl group as defined herein.

The term "hydroxyl" as used herein can refer to —OH or its ionized form, —O—.

The term "amine" (or "amino") as used herein refers to —NR$^{65}$R$^{66}$ groups, wherein R$^{65}$ and R$^{66}$ are independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine is alkylamino, dialkylamino, arylamino, or alkylarylamino.

As used herein, the term "partially cross-linked polymer" is intended to refer to a polymer that contains a hyperbranched polymer that may be partially gelled but which has functional groups that are amenable to further cross-linking upon water evaporation and film formation.

As used herein, the term "hyperbranched polymer" refers to a polymer having a main polymer chain and at least two branching points along the main polymer chain, that may also themselves have further branching points.

The term "microgel," as used herein, refers to dispersions of polymeric particles which are internally crosslinked without any significant amount of crosslinking in the continuous phase so as to provide dispersions with lower viscosity and higher solids content. These microgels form a coherent film upon film formation. As used herein, a "co-resin microgel" is different from a microgel defined above in that "at least a fraction of particles" in a co-resin microgel dispersion includes at least 2 polymers. The polymers can be different in MW, composition, or both.

As used herein, the term "partially neutralized" is intended to refer to neutralization of about 5 mol % or more, up to an including about 95%, of the acid groups on the acid-functional resin. However, in some embodiments, partial neutralization refers to neutralization of from about 20 mol % to about 95 mol % of the acid groups. This may include in various embodiments at least about 5 mol % of the acid groups, at least about 10 mol % of the acid groups, from about 10 mol % to about 95 mol % of the acid groups, from about 8 mol % to about 85 mol % of the acid groups, or from about 15 mol % to about 50 mol % of the acid groups. In some embodiments, about 30 mol % of the acid groups on the acid-functional resin may be neutralized.

Preparing single-pack waterborne coating systems having properties similar to that of two-pack technologies remains a challenge in the coatings industry. The present invention provides a process of preparing a stable, single-pack hyperbranched resin dispersion with a clean water phase without the need to use ionic initiators and hydrophilic surfactants. The dispersions exhibit improved water sensitivity, corrosion resistance, humidity resistance, and the like. The dispersion is made with functionalities that allow for post-film formation crosslinking in a single pack system. Such functionalities include monomers with reactive keto groups such as diacetone acrylamide (DAAM), diacetone methacrylamide, vinylacetoacetate, acrolein, and methacrolein.

The dispersion may be prepared from either (i) a single, acid functional resin that is lightly functionalized with DAAM (less than two DAAM per molecule), or (ii) from two resins, one of which is highly DAAM functional (more than 2 DAAM per molecule).

The acid-functional resins are added to the reactor and heated in water to a temperature of about 88° C. to 92° C. At this temperature, the resin is then partially neutralized with a base to form a dispersion. After a hold period and maintaining the same temperature range, multi- and mono-functional epoxy reagents are added to the dispersion. Through this process, DAAM functionality may be added to an epoxy-acrylate adduct or during the acid-functional resin synthesis. The dispersion is then cooled and a multi-functional amine and/or hydrazide is added to the dispersion to allow crosslinking after film formation via latent crosslinking capability. As used herein, "latent crosslinking capability" refers to the ability of one or more types of functionalities on the polymer backbone to further react and create covalent bonds upon application and water evaporation from the film.

Advantages include the use of ambient temperature for curing. In some embodiments, heating may be used to increase curing. Also, drying may activate the latent crosslinking of a polymer through changes in pH, evaporation of solvents (e.g., water, acetone, and other water compatible solvents) or carriers, or other changes that begin the crosslinking reaction. In some embodiments, the latent crosslinking capability takes advantage of a Schiff-base reaction by crosslinking keto- and amine- or hydrazine-type-functionalities to form an imine (or Schiff-base).

Post-film formation crosslinking (i.e. the latent crosslinking capability) may improve coating properties such as chemical resistance and hardness.

In a first aspect, a single waterborne dispersion is provided. The dispersion includes a hyperbranched polymer having latent crosslinking functionality, the hyperbranched polymer including the reaction product of a partially neutralized, acid-functional resin; and an epoxy; and the dispersion optionally may include an effective amount of a crosslinking agent. In the dispersion, the partially neutralized, acid-functional resin includes the reaction product of a mixture of a first acid-functional resin with a base and a second acid-functional resin; or a first and a second acid-functional resin with a base; the first acid-functional resin is not the same as the second acid-functional resin; and at least one of the acid functional resins includes a further functional group capable of Schiff-Base crosslinking after film formation. The base that is used in the partial neutralization may be an inorganic or organic base. Suitable bases include, but are not limited to, $NH_3(g)$, $NH_3$ (aq), alkali metal hydroxides, which include monovalent alkali metal hydroxides (e.g., NaOH and KOH). In some embodiments, the base is a mixture of any two or more bases thereof. In some embodiments the base that is used in the partial neutralization is $NH_3$, $NH_{3\ (aq)}$, NaOH, KOH, or a mixture of any two or more thereof. In some embodiments, the base that is used in the partial neutralization may be $NH_3$ or $NH_{3\ (aq)}$.

As noted above, the first acid-functional resin is not the same as the second acid-functional resin. The difference may be one or more of composition, glass transition temperature, and/or molecular weight.

To prepare the dispersion, at least about 5 mol % of acid groups on the acid-functional resin may be neutralized. In some embodiments, this may include from about 5 mol % to about 95 mol %, from about 15 mol % to about 90 mol %, or from about 20 mol % to about 85 mol %.

The epoxy undergoes ring opening when treated with the acid groups on the acid-functional resin epoxy. In the dispersions, from about 5 mol % to about 95 mol % of acid groups on the acid-functional resin are bonded to the epoxy. In some embodiments, this may include from about 25 mol % to about 90 mol %, from about 40 mol % to about 85 mol %, or from about 60 mol % to about 80 mol % of acid groups on the acid-functional resin are bonded to the epoxy.

The first and second acid-functional resins may be, individually, an acid functional acrylic resin, a styrene-acrylic resin, a non-acrylic acid functional resin, or a hybrid acrylic acid-functional resin. Such polymers may include, but are not limited to, one or more polymerized monomers such as 2-hydroxyethyl acrylate, 2-hydroxyethyl methacrylate, 2,3-hydroxypropyl acrylate, 2,3-hydroxypropyl methacrylate, 2,4-hydroxybutyl acrylate, 2,4-hydroxybutyl methacrylates, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, or isobornyl methacrylate. In some embodiments, the first and second acid-functional resins individually include one or more polymerized monomers selected from the group consisting of vinylbenzoic acid, crotonic acid, itaconic acid, sorbic acid, cinnamic acid, citraconic acid, chloroacrylic acid, mesaconic acid, maleic acid, fumaric acid, ethacrylic acid, acrylic acid, methacrylic acid, sodium-2-sulfoethyl acrylate, sodium N-(1,1-dimethyl-2-sulfoethyl)acrylamide, or 3-acrylamido-3-methylbutanoic acid.

In the dispersions, the epoxy that is used in the formation of the hyperbranched polymer may include a plurality of epoxy groups. In some embodiments, the epoxy includes a polyepoxy-functional polymer, a monoepoxy-functional polymer, or a mixture of any two or more thereof. Where the epoxy includes a polyepoxy-functional polymer, it may have an epoxy equivalent weight of about 100 grams/eq. to about 1000 grams/eq. This may include from about 100 grams/eq. to about 800 grams/eq., or about 100 grams/eq. to about 500 grams/eq.

In some embodiments, where the dispersion includes the polyepoxy-functional polymer, it may include a glycidyl ester or ether polymer, a glycidyl amine polymer, a cyclohexanedimethanol diglycidyl ether polymer, a polypropylene oxide diglycidyl ether polymer, a bisphenol A diglycidyl ether polymer, a bisphenol F diglycidyl ether polymer, or a mixture of any two or more thereof.

In some embodiments, where the dispersion includes the monoepoxy-functional polymer, it may include a glycidyl ether polymer, a glycidyl ester polymer, a glycidyl amine polymer, a glycidyl ester polymer, or a mixture of any two or more thereof. For example, the monoepoxy-functional polymer may include a glycidyl methacrylate, a glycidyl ester of neodecanoic acid, a bisphenol A monoglycidyl ether, a 2-ethylhexyl glycidyl ether, or a mixture of any two or more thereof.

In some embodiments, where the dispersion includes the monoepoxy-functional polymer, it may have an epoxy equivalent weight of about 70 grams/eq. to about 1000 grams/eq. This may include from about 70 grams/eq. to about 800 grams/eq., or about 70 grams/eq. to about 500 grams/eq.

In the dispersion, the acid-functional resin that forms the hyperbranched polymer may include the polymerization product of a mixture of monomers that includes a styrenic monomer; and a monomer of formula V, maleic anhydride, itaconic acid, an ester of itaconic acid, or a mixture of any two or more thereof, where

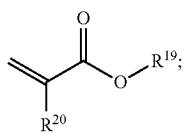

Formula V $R^{20}$ is hydrogen or $CH_3$; and $R^{19}$ is a hydrogen, alkyl, cycloalkyl, aryl, or alkaryl. In some embodiments, $R^{19}$ is a $C_1$-$C_{20}$ alkyl, a $C_3$-$C_{20}$ cycloalkyl, $C_5$-$C_{12}$ aryl, or a $C_5$-$C_{20}$ alkaryl. In any of the above embodiments, the acid-functional resin has a number average molecular weight ($M_n$) of about 1000 g/mol to about 30,000 g/mol. In any of the above embodiments, the acid-functional resin may have a number average molecular weight ($M_n$) of about 2500 g/mol to about 20,000 g/mol.

In any of the above embodiments, the hyperbranched polymer may have an acid number from about 15 mg KOH/g to about 300 mg KOH/g in some embodiments, or about 20 mg KOH/g to about 250 mg KOH/g in other embodiments. As noted above, the hyperbranched polymer may be a microgel.

In the dispersion, the further functional group may be a carbonyl group. For example, the further functional group may be a ketone or the like.

In the dispersion when it includes a crosslinking agent, the agent may be a polyamine, a polyhydrazide, a hydrazine, or a mixture of any two or more thereof. The crosslinking agent for reaction with the latent crosslinking functionality need only be present in an amount necessary to achieve the desired degree of cure. For many applications, the crosslinking agent will typically be present at a level to provide at least 0.1 equivalent for each equivalent of latent crosslinking functionality. In some embodiments, the crosslinking agent may be present at a level to provide between about 0.2 to about 2.0 equivalents for each equivalent of latent crosslinking functionality. In some other embodiments the crosslinking agent may be present at a level to provide 0.4 to about 1.2 equivalents for each equivalent of latent crosslinking functionality. In further embodiments, the crosslinking agent may be present at a level to provide about 0.4 to about 1.0 equivalent for each equivalent of latent crosslinking functionality.

Any of the dispersions described herein may find utility in a printing ink, a surface coating, or an overprint varnish. For examples, the dispersions may be used in a coating composition such as, but not limited to, clear coatings or colored paint coatings that include a wide variety of with pigment. The coating compositions may include other typical paint additives such as dispersants, pigments, extenders and fillers, rheology modifiers, solvents, and/or wetting agents.

In another aspect, a waterborne polymer dispersion is provided that includes, based on the total solids weight, about 1 wt % to about 99 wt %, on a solids basis, of a non-self-crosslinkable waterborne polymer dispersion and about 99 wt % to about 1 wt %, on a solids basis, of a self-crosslinkable waterborne polymer dispersion that includes a hyperbranched polymer having latent crosslinking functionality and comprising the reaction product of: a partially neutralized, acid-functional resin; and an epoxy; and optionally, an effective amount of a crosslinking agent. The partially neutralized, acid-functional resin may include the reaction product of a mixture of: a first acid-functional resin with a base and a second acid-functional resin; or a first and a second acid-functional resin with a base; where the first acid-functional resin is not the same as the second acid-functional resin; and at least one of the acid functional resins comprises a further functional group capable of Schiff-Base crosslinking after film formation. This includes from about 10 wt % to about 90 wt %, on a solids basis, of a non-self-crosslinkable waterborne polymer dispersion and about 90 wt % to about 10 wt %, on a solids basis, of the self-crosslinkable waterborne polymer dispersion; or from about 20 wt % to about 80 wt %, on a solids basis, of a non-self-crosslinkable waterborne polymer dispersion and about 80 wt % to about 20 wt %, on a solids basis, of the self-crosslinkable waterborne polymer dispersion; or from about 40 wt % to about 60 wt %, on a solids basis, of a non-self-crosslinkable waterborne polymer dispersion and about 60 wt % to about 40 wt %, on a solids basis, of the self-crosslinkable waterborne polymer dispersion.

In another aspect, a waterborne polymer dispersion is provided and includes a partially neutralized, acid functional latex and water; wherein the partially neutralized, acid functional latex is the reaction product of an emulsion-polymerized reaction mixture and an epoxy compound and the emulsion-polymerized reaction mixture includes about 1 wt % to about 25 wt % of a monomer having latent crosslinking functionality, about 0.5 wt % to about 15 wt % of an acid functional monomer, and about 60 wt % to about 98.5 wt % of at least one other copolymerizable monomer. In some embodiments, the partially neutralized, acid functional latex is a microgel.

In some embodiments, the emulsion polymerization product has a weight average molecular weight ($M_w$) of about 1000 g/mol to about 100,000 g/mol, In some embodiments, the emulsion polymerization product has a weight average molecular weight ($M_w$) of about 2500 g/mol to about 50,000 g/mol or about 3000 g/mol to about 35,000 g/mol.

In some embodiments of the waterborne polymer dispersion, the latent crosslinking functionality includes carbonyl groups.

In some embodiments of the waterborne polymer dispersion further includes a crosslinking agent selected from the group consisting of polyamines, polyhydrazides, polyhydrazines, and a mixture of any two or more thereof.

In some embodiments of the waterborne polymer dispersion, the emulsion-polymerized reaction mixture is partially neutralized with an inorganic or organic base. Suitable organic bases include amine bases, such as $NH_3$ and $NH_{3\ (aq)}$ Suitable inorganic bases include, but are not limited to, alkali metal hydroxides, which include monovalent alkali metal hydroxides (e.g., NaOH and KOH). In some embodiments, the base is a mixture of any two or more bases thereof. In some embodiments of the waterborne polymer dispersion, the emulsion-polymerized reaction mixture is partially neutralized with $NH_3$, $NH_{3\ (aq)}$, NaOH, KOH, or a mixture of any two or more thereof. In some embodiments, at least about 5 mol % of the acid groups on the latex are neutralized. In some embodiments, up to about 95 mol % of the acid groups on the latex are bonded to the epoxy.

The latex may include an acid functional acrylic resin, a styrene-acrylic resin, a non-acrylic acid functional resin, a hybrid acrylic acid-functional resin, or a mixture of any two or more thereof. The latex may include in various embodiments, one or more copolymerizable monomers such as 2-hydroxyethyl acrylate, 2-hydroxyethyl methacrylate, 2,3-hydroxypropyl acrylate, 2,3-hydroxypropyl methacrylate, 2,4-hydroxybutyl acrylate, 2,4-hydroxybutyl methacrylates, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, or isobornyl methacrylate. In some embodiments, the acid-functional resin is vinylbenzoic acid, crotonic acid, itaconic acid, sorbic acid, cinnamic acid, citraconic acid, chloroacrylic acid, mesaconic acid, maleic acid, fumaric acid, ethacrylic acid, acrylic acid, methacrylic acid, sodium-2-sulfoethyl acrylate, sodium N-(1,1-dimethyl-2-sulfoethyl) acrylamide, 3-acrylamido-3-methylbutanoic acid, or a mixture of any two or more thereof.

In the dispersions, the epoxy that is used in the formation of the hyperbranched polymer may include a plurality of epoxy groups. In some embodiments, the epoxy includes a polyepoxy-functional polymer, a monoepoxy-functional polymer, or a mixture of any two or more thereof. Where the epoxy includes a polyepoxy-functional polymer, it may have an epoxy equivalent weight of about 100 grams/eq. to about 1000 grams/eq. This may include from about 100 grams/eq. to about 800 grams/eq., or about 100 grams/eq. to about 500 grams/eq.

In some embodiments, where the dispersion includes the polyepoxy-functional polymer, it may include a glycidyl ester or ether polymer, a glycidyl amine polymer, a cyclohexanedimethanol diglycidyl ether polymer, a polypropylene oxide diglycidyl ether polymer, a bisphenol A diglycidyl ether polymer, a bisphenol F diglycidyl ether polymer, or a mixture of any two or more thereof.

In some embodiments, where the dispersion includes the monoepoxy-functional polymer, it may include a glycidyl ether polymer, a glycidyl ester polymer, a glycidyl amine polymer, a glycidyl ester polymer, or a mixture of any two or more thereof. For example, the monoepoxy-functional polymer may include a glycidyl methacrylate, a glycidyl ester of neodecanoic acid, a bisphenol A monoglycidyl ether, a 2-ethylhexyl glycidyl ether, or a mixture of any two or more thereof.

In some embodiments, where the dispersion includes the monoepoxy-functional polymer, it may have an epoxy equivalent weight of about 70 grams/eq. to about 1000 grams/eq. This may include from about 70 grams/eq. to about 800 grams/eq., or about 70 grams/eq. to about 500 grams/eq.

In the dispersion, the acid-functional resin that forms the hyperbranched polymer may include the polymerization product of a mixture of monomers that includes a styrenic monomer; and a monomer of formula V, maleic anhydride, itaconic acid, an ester of itaconic acid, or a mixture of any two or more thereof, where

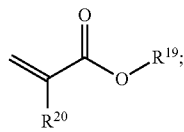

Formula V $R^{20}$ is hydrogen or $CH_3$; and $R^{19}$ is a hydrogen, alkyl, cycloalkyl, aryl, or alkaryl. In some embodiments, $R^{19}$ is a $C_1$-$C_{20}$ alkyl, a $C_3$-$C_{20}$ cycloalkyl, $C_5$-$C_{12}$ aryl, or a $C_5$-$C_{20}$ alkaryl. In any of the above embodiments, the latex has a $M_n$ of about 1000 g/mol to about 100,000 g/mol. In any of the above embodiments, the latex may have a $M_n$ of about 1000 g/mol to about 10,000 g/mol. In some embodiments, the latex may have an $M_n$ of about 2500 g/mol to about 20,000 g/mol.

In any of the above embodiments, the hyperbranched polymer may have an acid number from about 15 mg KOH/g to about 300 mg KOH/g in some embodiments, or about 20 mg KOH/g to about 250 mg KOH/g in other embodiments. As noted above, the hyperbranched polymer may be a microgel.

In another aspect, a waterborne polymer dispersion is provided and includes, based on the total solids weight in the polymer dispersion, from about 1 wt % to about 99 wt % of a latent crosslinkable functionalized latex; and from about 1 wt % to about 99 wt % of a hyperbranched polymer having latent crosslinking functionality. The latent crosslinkable functionalized latex and the hyperbranched polymer may be any of the latexes and polymers as described herein. In some embodiments, the hyperbranched polymer comprises the reaction product of: two or more acid-functional resins; and an epoxy, where the hyperbranched polymer includes a functional group amenable to participate in Schiff-Base crosslinking after film formation. In some embodiments, the latent crosslinkable functionalized latex includes water and a partially neutralized, acid functional latex that is the reaction product of an emulsion-polymerized reaction mixture including about 1 wt % to about 25 wt % of a monomer having latent crosslinking functionality; about 0.5 wt % to about 15 wt % of an acid functional monomer; an epoxy compound; and about 60 wt % to about 98.5 wt % of at least one other copolymerizable monomer.

In any of the above embodiments, the latent crosslinkable functionalized latex may include one or more polymerized acid functional monomers that are one or more of vinylbenzoic acid, crotonic acid, itaconic acid, sorbic acid, cinnamic acid, citraconic acid, chloroacrylic acid, mesaconic acid, maleic acid, fumaric acid, ethacrylic acid, acrylic acid, methacrylic acid, sodium-2-sulfoethyl acrylate, sodium N-(1,1-dimethyl-2-sulfoethyl)acrylamide, or 3-acrylamido-3-methylbutanoic acid.

In any of the above embodiments, a waterborne polymer dispersion may include, an a total solids basis, from about 10 wt % to about 90 wt %, on a solids basis, of latent cross linkable functionalized latex and from about 90 wt % to about 10 wt % of the hyperbranched polymer having latent crosslinking functionality, or from about 20 wt % to about 80 wt %, on a solids basis, of latent cross linkable functionalized latex and from about 80 wt % to about 20 wt % of the hyperbranched polymer having latent crosslinking functionality; or from about 40 wt % to about 60 wt %, on a solids basis, of latent cross linkable functionalized latex and from about 60 wt % to about 40 wt % of the hyperbranched polymer having latent crosslinking functionality.

The dispersions disclosed herein may include a variety of additives, such as, e.g. biocides. As used herein, a "biocide" is any substance that kills or inhibits the growth of microorganisms such as bacteria, molds, slimes, fungi, algae and the like. Illustrative biocides may include thiazolinones, triazines, sulfates, carbamates, oxazolidines, morpholines, phenolics, pyrithiones, and the like. For example, and without limitation, the biocide may be 1,2-benzoisothiazolin-3-one, 2-methyl-4-isothiazolin-3-one, tetrakis (hydroxymethyl) phosphonium sulfate (THPS), 1,3,5-tris (2-hydroxyethyl)-s-triazine, iodopropynylbutylcarbamate, 4,4-dimethyloxazolidine, 7-ethyl bicyclooxazolidine, a combination of 4-(2-nitrobutyl)-morpholine with 4,4'-(2-ethyl-2-nitrotrimethylene) dimorpholine, a combination of 5-chloro-2-methyl-4-isothiazolin-3-one with 2-methyl-4-isothiazolin-3-one, 2-bromo-2-nitro-1,3-propanediol, octylisothiazolinone, dichloro-octylisothiazolinone, dibromo-octylisothiazolinone, phenolics such as o-phenylphenol and p-chloro-m-cresol and their corresponding sodium and/or potassium salts, sodium pyrithione, zinc pyrithione, n-butyl benzisothiazolinone, 1-(3-chloroallyl)-3,5,7-triaza-1-azoniaadamantane chloride, chlorothalonil, carbendazim, diiodomethyltolylsulfone, trimethyl-1,3,5-triazine-1,3,5-triethanol, 2,2-dibromo-3-nitrilopropionamide, glutaraldehyde, N,N'-Methylene-bis-morpholine, ethylenedioxy methanol, phenoxyethanol, tetramethylol acetylenediurea, dithiocarbamates, 2,6-dimethyl-m-dioxan-4-ol acetate, dimethylol-dimethyl-hydantoin, tris(hydroxymethyl)nitromethane, bicyclic oxazolidines, or a mixture of any two or more such biocides. In some embodiments, the biocide may include 1,2-benzoisothiazolin-3-one and/or 2-methyl-4-isothiazolin-3-one.

The present invention, thus generally described, will be understood more readily by reference to the following examples, which are provided by way of illustration and are not intended to be limiting of the present invention.

EXAMPLES

The monomers abbreviations used below are as follows:
"AA" is an abbreviation for acrylic acid;
"BA" is an abbreviation for butyl acrylate;
"MAA" is an abbreviation for methacrylic acid;
"MMA" is an abbreviation for methyl methacrylate;
"2-EHA" is an abbreviation for 2-ethylhexylacrylate
"HEA" is an abbreviation for hydroxyethylacrylate
"STY" is an abbreviation for styrene;
"DAAM" is an abbreviation for diacetone acrylamide;
"ADH" is an abbreviation for adipic acid dihydrazide;
"AAEM" is an abbreviation for acetoacetoxyethyl methacrylate;
"NPDGE" is an abbreviation for neopentyl diglycidyl ether;
"C(12/14)GE" is an abbreviation for $C_{12}$-$C_{14}$ monoglycidyl ether;
"GPTS" is an abbreviation for gamma-glycidoxypropyltrimethoxysilane;
"BisFDGE" is an abbreviation for bisphenol F diglycidyl ether;
"PEO (11) DGE" is an abbreviation for polyethyleneoxide diglycidyl ether;

"APS" is an abbreviation for ammonium persulfate
"tBHP" is an abbreviation for tert-butylhydroperoxide; and
"IOMPA" is an abbreviation for isooctyl 3-mercaptopropionate.

General Procedures. GPC spectra were acquired with a Waters 2695 instrument and was used to determine molecular weight of polymers using THF as the mobile phase at 40° C. and a RI detector. All samples were analyzed for $M_n$, $M_w$, and PDI using elution times calibrated against polystyrene molecular weight standards.

Solids content. Solids content of the dispersions were measured gravimetrically by drying about a 500 mg sample of dispersions in a 140° C. oven for 1 hour.

Particle size. Particle size of the dispersions were measured using a nano-flex particle sizer from Microtrac.

Gel content and swell ratio. A sample of the resin emulsion (2 grams) is added to tetrahydrofuran (36 grams) and shaken for 3 days on an orbital table shaker. The sample is then centrifuged at 30000 rpm for 3 hours. Any gel will go to the bottom of the centrifuge tube, the solids are measured for the top layer and compared to the total solids of the emulsion and any decrease in solids is due to the presence of gel. In addition, the GPC of the centrifuged top layer is measured and compared that to the whole sample.

Minimum Film Formation Temperature (MFFT). The MFFT was measured according to ASTM D2354-10.

Hardness. König hardness was measured according to ASTM D4366-16.

Gloss. Gloss was measured according to ASTM D523-14.

Chemical resistance. Chemical resistance was measured according to ASTM D5402-15 or ASTM D4752-03 using 70 weight percent aqueous isopropanol.

Example 1. Polymeric Resins Synthesized Via Continuous High Temperature Polymerization Process. Polymers suitable for use in this invention may be prepared via addition polymerization in homogenous or heterogeneous media. Therefore, common techniques such as bulk polymerization, solution polymerization, emulsion polymerization, etc. can be used to generate suitable polymers according to this invention.

Table 1 summarizes the composition of the polymers. The polymers were made a continuous free radical polymerization process at relatively high temperatures. Here, the polymerization takes place in a homogenous environment. High reaction temperatures allow achieving low molecular weights without the use of chain transfer agents. After the polymerization step, the resin is subjected to a devolatilizer to remove unreacted monomers and process solvents. Note: the polymers presented in Table 1 were prepared via a high temperature, continuous polymerization process as described in U.S. Pat. Nos. 5,461,60; 4,414,370; and 4,529,787, all of which are incorporated herein by reference.

TABLE 1

Polymeric Resins Synthesized via a Continuous Polymerization Process.

| Polymer | Polymer composition (wt %) | Tg (° C.) | Mn (kDa) | Mw (kDa) | PDI | COOH mmol/g | CM* mmol/g |
|---|---|---|---|---|---|---|---|
| P1 | 49 MMA/27 Sty/14 BA/10 AA | 75 | 5.1 | 15.8 | 3.1 | 1.387 | 0 |
| P2 | 50 MMA/30 Sty/10 AA/10 DAAM | 85 | 3.3 | 8.1 | 2.6 | 1.387 | 0.591 |
| P3 | 44.5 MMA/24.5 Sty/ 10.5 2-EHA/ 10.5 AA/10 DAAM | 62 | 4.1 | 11.5 | 2.8 | 1.387 | 0.591 | wt = weight
*CM = Crosslinkable Moiety

Example 2. Aqueous Resin Dispersions. Acid functional polymers described in Table 1 were dispersed in water by neutralizing a fraction of their acid groups with a base under agitation and heat. For example, a dispersion of P1 at 43 weight % solids was prepared by adding 518.6 grams of P1 and 668 grams deionized water and 13.4 grams ammonia (29 wt % active) to a reaction vessel equipped with a condenser and an overhead stirrer. This mixture was heated to 88-92° C. under agitation and kept for 4 hours after which it was cooled to room temperature and filtered.

Table 2 describes the polymer dispersions prepared in this manner. It is possible to make dispersions that contain more than one acid functional polymer with this methodology by starting from a mixture of polymers. This way particles are formed that contain both starting resins.

TABLE 2

Aqueous Resin Dispersions made from Polymeric Resins Synthesized Via Continuous Polymerization Process

| Dispersion | Resin Composition | Solids | pH | Visc. (mPa·sec) | NH₄OH mmol/g | d (nm) |
|---|---|---|---|---|---|---|
| PD1 | P1 | 43.0 | 7.01 | 1050 | 0.178 | 57 |
| PD2 | P2 | 43.3 | 7.04 | 140 | 0.213 | 57 |
| PD3 | P3 | 43.1 | 7.2 | 240 | 0.196 | 108 |

TABLE 2-continued

Aqueous Resin Dispersions made from Polymeric Resins Synthesized Via Continuous Polymerization Process

| Dispersion | Resin Composition | Solids | pH | Visc. (mPa·sec) | NH₄OH mmol/g | d (nm) |
|---|---|---|---|---|---|---|
| PD4 | 80% P1, 20% P3 | 42.4 | 7.3 | 160 | 0.178 | 77 |
| PD5 | 50% P1, 50% P3 | 42.5 | 7.2 | 200 | 0.178 | 77 |

Visc. = viscosity,
d = diameter

Example 3. Polymeric Resins Synthesized via a Heterogeneous Free Radical Polymerization Processes. Polymers may also be prepared via a heterogeneous free radical polymerization process. Table 3 summarizes the compositions and characteristics of polymers by such a process. For instance, the following procedure was used to prepare a dispersion of D5 with about 45% solids.

Deionized water (359.6 grams) was placed in a reaction vessel equipped with a condenser, an overhead stirrer and two addition ports. 1-Poly(oxyethylene)$_{20}$-2-vinyl-4-nonylphenyl ether ammonium sulfate (1.35 grams) and polyethylene glycol ether made from a C10-Guerbet alcohol and alkylene oxides (4.5 grams) were added to the vessel and flushed with deionized water and the mixture was heated to 85° C. under a nitrogen blanket. A monomer mixture (880.6 grams) was prepared according to the composition shown in Table 3 and emulsified in 400 grams deionized water using 10 grams of 1-poly(oxyethylene)$_{20}$-2-vinyl-4-nonylphenyl ether ammonium sulfate to form a stable monomer pre-emulsion. Five percent of the monomer pre-emulsion was pre-charged to the reaction vessel in one shot followed by the addition of tBHP solution (1.4 grams) and APS (3.6 grams) in deionized water. The mixture was held for 5 minutes after which the monomer pre-emulsion was fed into the reaction vessel over 2 hours. A second stream of 20.5 grams ammonia (29 wt %) in 40 grams of deionized water was fed to the vessel in parallel to the monomer feed. The reaction mixture was kept at temperature for an additional 10 minutes after the feed ended. A solution of 1.24 grams isoascorbic acid in 21 grams deionized water was added over 20 minutes to reduce residual monomers. The reaction mixture was then cooled and filtered.

TABLE 3

Aqueous Dispersions from Polymeric Resins Synthesized via a Heterogeneous Free Radical Polymerization Process.

| Polymer | Polymer composition (wt %) | Tg (° C.) | Mn (k Da) | Mw (k Da) | PDI |
|---|---|---|---|---|---|
| D1 | 36 MMA/15 Sty/25 BA/7 MAA/12 AAEM/5 IOMPA | 27 | 3.4 | 7.8 | 2.3 |
| D3 | 39 MMA/15 Sty/29 BA/7 MAA/5 AAEM/5 IOMPA | 22 | 3.5 | 8.0 | 2.3 |
| D4 | 41.5 MMA/23 Sty/10 EHA/9 MAA/2 AA/10 DAAM/4.5 IOMPA | 57 | 3.5 | 8.4 | 2.4 |
| D5 | 44.5 MMA/23 Sty/10 EHA/9 MAA/2 AA/10 DAAM/1.5 IOMPA | 81 | 7.6 | 24.3 | 3.2 |

Table 3. Data Continued

| Polymer | Solids | pH | Visc. (mPa.sec) | MFFT (° C.) | d (nm) | COOH mmol/g | CM* mmol/g |
|---|---|---|---|---|---|---|---|
| D1 | 43.3 | 5.9 | 26 | 9 | 125 | 0.813 | 0.560 |
| D3 | 43.4 | 5.9 | 22 | 12 | 126 | 0.813 | 0.233 |
| D4 | 44.1 | 5.5 | 87 | 37 | 190 | 1.323 | 0.591 |
| D5 | 44.8 | 5.6 | 191 | 55 | 153 | 1.323 | 0.591 |

*CM = Crosslinkable Moiety

Example 4. Hyperbranched Resin Dispersions with a Self-Crosslinking Ability Prepared via a Schiff-Base. Resin 2 (R2) is a polymer dispersion that was prepared by reacting PD3 with neopentyl diglycidyl ether (NPDGE) and C12-C14 mono glycidyl ether (C12/14GE) and γ-glycidoxypropyltrimethoxysilane (GPTS) according to the ratios shown in Table 4. The dispersion was heated to 90° C. followed by addition of NPDGE. After 120 min, C12/C14GE and GPTS were added together and the reaction was continued for an additional 180 min after which the reaction mixture was cooled to 50-55° C. at which time 0.75 equivalents of ADH relative to ketone groups present in the resin was added to promote self-crosslinking. The reaction mixture was cooled to ambient temperature (about 22° C.) and filtered yielding polymeric resin dispersion R2. Polymer dispersions R3, R4 & R5 were also prepared according to this procedure.

TABLE 4

Resin Dispersion Monomer Percentage by Weight Relative to Resin Solids.

| Resin/Monomer | R1 | R2 | R3 | R4 | R5 |
|---|---|---|---|---|---|
| P1/wt % | 84.04 | | | | |
| P3/wt % | | 80.43 | 80.76 | 78.58 | 79.81 |
| NPDGE/ wt % | 3.69 | 4.52 | | | |
| C12/C14 GE/ wt % | 11.02 | 13.47 | 13.52 | 9.40 | 9.54 |
| GPTS/ wt % | 1.26 | 1.58 | | 1.55 | |
| BisFDGE/wt % | | | 5.72 | | |
| PEO(11)DGE/ wt % | | | | 10.48 | 10.64 | wt = weight

TABLE 5

Property Data for the Resin Dispersions Produced in Table 4.

| Property | R1 | R2 | R3 | R4 | R5 |
|---|---|---|---|---|---|
| Solids (%) | 42.3 | 42.6 | 42.8 | 42.8 | 43.0 |
| pH | 8.5 | 8.5 | 8.3 | 8.3 | 8.2 |
| Viscosity (mPa · sec) | 380 | 48 | 56 | 225 | 1562 |
| d (nm) | 82 | 126 | 92 | 146 | 115 |
| MFFT (° C.) | 24.5 | 20 | 25 | 14 | 9 |

Example 5. Chemical Resistance Testing on Cured Coating Films. Dispersions were blended with suitable amounts of ethylene glycol monobutyl ether to drop the MFFT of the mixture to about 0° C. The mixtures prepared in this manner were then drawn down on cold rolled steel ("CRS") and/or aluminum panels using a wire-wound rod. The films were dried in a controlled temperature and humidity ("CTH") room at 25° C. and 50% relative humidity overnight. Subsequently, the coated panels were annealed at 50° C. overnight prior to testing. Film thicknesses were 50±6 microns. Chemical resistance testing was done using ASTM D5402-15 and 70 wt % isopropanol (IPA). The values in Table 6 represent the average to three trials each on CRS substrates.

TABLE 6

Rubbing testing on examples R1-R4.

| Example | 70% IPA Double Rubs after 14 days |
|---|---|
| R1 | 61 |
| R2 | 247 |

TABLE 6-continued

Rubbing testing on examples R1-R4.

| Example | 70% IPA Double Rubs after 14 days |
|---|---|
| R3 | 445 |
| R4 | 194 |

Resin dispersions R2, R4, and R3 demonstrate an improved chemical resistance as judged by isopropanol double rubs over R1. Resin dispersions R2, R4, and R3 have the ability to self-crosslink via Schiff-Base formation as opposed to resin dispersion R1.

Example 6. Chemical Resistance and König Hardness Testing on Cured Coating Films with and without ADH. Dispersions were blended with suitable amounts of ethylene glycol monobutyl ether to drop the MFFT of the mixture to about 0° C. The mixture prepared in this manner was drawn down on CRS panels using a wire-wound rod. König hardness was evaluated according to ASTM D4366-16. Chemical resistance testing was done according to Example 5, and as shown in Table 7.

TABLE 7

Chemical Resistance Testing with and without ADH.

| | 70% IPA Double Rub | | Hardness (swing) | |
|---|---|---|---|---|
| Sample | 1 Day | 7 Days | 1 Day | 7 Days |
| R5 with ADH | 99 | 151 | 31 | 53 |
| R5 without ADH | 39 | 44 | 24 | 45 |

ADH was added at 0.75 equivalents relative to ketone groups present in resin dispersion.

After self-cross linking, resin dispersion R5 demonstrated an improved chemical resistance and König hardness compared with the same resin dispersion without self-crosslinking.

Example 7. [2-Hydroxy-3-[4-[[4-(oxiran-2-ylmethoxy)phenyl]methyl]phenoxy]propyl] 4-oxopentanoate and its regioisomer & Resin Dispersion Therefrom with Ketone Equivalent for Self-Crosslinking.

Levulinic acid (1.1 moles) was reacted with bisphenol F diglycidyl ether (1.0 mole) in the presence of triethylamine (0.06 grams) at 120° C. for 940 minutes to yield the desired monofunctional epoxy derivative. The title compound was obtained as a light brown resinous oil and had an epoxy equivalent weight of 523 g/mol by epoxy titration.

Following the synthetic procedure of Example 4, the following resin dispersions were synthesized.

TABLE 8

Resin Dispersion Monomer Percentage by Weight Relative to Resin Solids.

| Monomer/Property | R13 | R14 |
|---|---|---|
| P1/wt % | 82.97 | 80.71 |
| NPDGE/wt % | 3.64 | 3.54 |
| C12/C14 GE/wt % | 6.58 | 0.75 |
| GPTS/wt % | 1.27 | 1.24 |
| Ketone equivalent from Example 7/wt % | 5.54 | 13.76 |
| Solids | 41.89 | 45.37 |
| pH | 8.03 | 7.78 |
| Viscosity (cP) | 47.5 | 315.5 |
| MFFT | 28.5 | 44.3 |
| d (nm) | 101.9 | 108.4 |

ADH was added at 0.75 equivalents relative to ketone groups present in the resin dispersion.

Example 8. Resin Dispersion Blends. Different blending methods were evaluated using the instant resin dispersions as described below:

Method 1. The two different resin flakes are mixed together in the ratio given below followed by the dispersion preparation as discussed in Example 2 and further reaction given in Example 4.

Method 2. The two different resin cuts after the dispersion preparation as discussed in Example 2 in the ratio discussed below followed by further reaction given in Example 4.

Method 4. R1 and R2, as prepared in Tables 4 and 5, were mixed together in the appropriate ratio as shown in Table 9.

TABLE 9

Resin Dispersions Blend Data.

| Example | Dispersion | Blend Method | Solids | pH | Viscosity (cP) | MV (nm) | MFFT (° C.) |
|---|---|---|---|---|---|---|---|
| 8-1 | R1 | None | 42.3 | 8.5 | 380 | 82 | 24.5 |
| 8-2 | R2 | None | 42.6 | 8.5 | 48 | 126 | 20 |
| 8-3 | R1/R2 (80/20) | 1 | 43.5 | 8.1 | 143 | 172 | 20 |
| 8-4 | R1/R2 (80/20) | 2 | 44.5 | 8.1 | 102 | 98 | 22 |
| 8-5 | R1/R2 (80/20) | 4 | 42 | 7.9 | | 135 | 20 |
| 8-6 | R1/R2 (50/50) | 1 | 43.8 | 8.1 | 114 | 112 | 22 |
| 8-7 | R1/R2 (50/50) | 2 | 44.3 | 8.2 | 184 | 127 | 22 |
| 8-8 | R1/R2 (50/50) | 4 | 42.0 | 7.9 | | 145 | 20 |

Example 9. Chemical Resistance Testing on Cured Coating Films from Resin Dispersion Blends. Using the resin dispersion blends prepared in Example 8, the testing described below was conducted. Dispersions were blended with the appropriate amount of ethylene glycol monobutyl ether to drop the MFFT of the mixture to about 0° C. The mixtures prepared in this manner were drawn down on aluminum panels using a wire-wound rod (#80). The films were dried in a CTH room at 25° C. and 50% relative humidity for one, seven, and fourteen days. Film thicknesses were 48±6 microns. Chemical resistance testing was done using ASTM D5402-15 and 70 wt % IPA. The values represent the average to three trials each. Sixty degree gloss was measured according to ASTM D523-14.

TABLE 10

Resin Dispersions Blend 60 Degree Gloss Data

| Example | Dispersion | Blend Method | Gloss @ 1 day | Gloss @ 7 days | Gloss @ 14 days |
|---|---|---|---|---|---|
| 8-1 | R1 | None | 88 | 89 | 87 |
| 8-2 | R2 | None | 90 | 91 | 89 |
| 8-3 | R1/R2 (80/20) | 1 | 91 | 91 | 91 |
| 8-4 | R1/R2 (80/20) | 2 | 90 | 90 | 90 |
| 8-5 | R1/R2 (80/20) | 4 | 89 | 90 | 89 |
| 8-6 | R1/R2 (50/50) | 1 | 91 | 90 | 91 |
| 8-7 | R1/R2 (50/50) | 2 | 89 | 90 | 89 |
| 8-8 | R1/R2 (50/50) | 4 | 90 | 90 | 89 |

The resin dispersions that are blends with other resin dispersions, Examples 8-3 through 8-8, show no decrease in gloss when compared with Examples 8-1 and 8-2. This demonstrates good resin compatibility and an excellent cross-linking mechanism which gives a coating of high gloss.

Chemical resistance testing was done using ASTM D5402-15 and 70 wt % IPA. The values in Table 11 represent the average of three trials each.

TABLE 11

Resin Dispersions Blend Chemical Resistance Data - IPA Double Rubs.

| Example | Dispersion | Blend Method | IPA Double Rubs @ 1 day | IPA Double Rubs @ 7 days | IPA Double Rubs @ 14 days |
|---|---|---|---|---|---|
| 8-1 | R1 | None | 43 | 48 | 66 |
| 8-2 | R2 | None | 131 | 299 | 297 |
| 8-3 | R1/R2 (80/20) | 1 | 41 | 59 | 72 |
| 8-4 | R1/R2 (80/20) | 2 | 39 | 71 | 87 |
| 8-5 | R1/R2 (80/20) | 4 | 37 | 48 | 70 |
| 8-6 | R1/R2 (50/50) | 1 | 78 | 108 | 123 |
| 8-7 | R1/R2 (50/50) | 2 | 62 | 75 | 91 |
| 8-8 | R1/R2 (50/50) | 4 | 55 | 65 | 86 |

Resin dispersion R2, and blends of resin dispersion R2 with resin dispersion R1, demonstrate an improved chemical resistance as judged by isopropanol double rubs over R1 by itself on an aluminum substrate. Resin dispersion R2 has the ability to self-crosslink via a Schiff-Base mechanism as opposed to resin dispersion R1.

Example 10. Self-Cross-Linkable Latexes. Resin 6 (R6) is a polymer dispersion that was prepared by reacting D1 with polyethyleneoxide diglycidyl ether (PEO(11)DGE) and bisphenol F diglycidyl ether (BisFDGE) according to the ratios shown in Table 11. The dispersion was heated to 90° C. and the pH was adjusted with ammonia followed by addition of PEO(11)DGE and BisFDGE. The reaction was held at 90° C. for four hours after which the reaction solution was cooled to 50-55° C. at which time 0.5 equivalents of 1,3-pentanediamine was optionally added to promote self-crosslinking. The reaction mixture was then cooled to ambient temperature (about 22° C.) and filtered to yield the functionalized latex. Functionalized latexes R7-R12 were prepared in a similar fashion.

TABLE 12

Functionalized Latexes Monomer Percentage by Weight Relative to Resin Solids

| Resin | Dispersion/ wt % | PEO(11) DGE wt % | BisFDGE wt % | C12/C14GE wt % | NPDGE wt % | GPTS wt % |
|---|---|---|---|---|---|---|
| R6 | D1/91.4 | 5.59 | 2.97 | | | |
| R7 | D5/41.8 PD1/41.8 | | | 11.43 | 3.76 | 1.18 |
| R8 | D1/29.0 PD1/56.64 | 5.74 | 3.05 | 5.55 | | |
| R10 | D3/91.4 | 5.59 | 2.97 | | | |
| R11 | D3/71.2 PD1/17.81 | 5.54 | 2.94 | 2.48 | | |
| R12 | D4/41.8 PD1/41.8 | | | 11.43 | 3.76 | 1.17 |

TABLE 13

Property Data for the Functionalized Latexes of Table 12.

| Resin | Solids | pH | Viscosity (mPa · sec) | d (nm) | MFFT (° C.) |
|---|---|---|---|---|---|
| R6 | 42.8 | 7.7 | 27 | 128 | 15 |
| R7 | 40.1 | 7.6 | 51 | 275 | 13 |
| R8 | 43.6 | 7.9 | 64 | 116 | 17 |
| R10 | 42.4 | 8.0 | 24 | 131 | 5 |
| R11 | 42.1 | 7.9 | 27 | 131 | 4 |
| R12 | 40.4 | 7.4 | 172 | 229 | <0 |

Example 11. Effect of AAEM on Coating Chemical Resistance. Functionalized latexes were blended with suitable amounts of ethylene glycol monobutyl ether to drop the MFFT of the mixture to about 0° C. The mixtures so prepared were drawn down on CRS panels using a wire-wound rod. The films were dried in a CTH room at 25° C. and 50% relative humidity overnight. Subsequently, the coated panels were annealed at 50° C. overnight prior to testing. Film thicknesses were 49±7 microns. Chemical resistance testing was done using ASTM D5402-15 and 70 wt % IPA. The values in Table 14 represent the average of three trials each.

TABLE 14

Effect of AAEM on Coating Chemical Resistance.

| Example | Dispersion/Latex | DAAM wt % in latex | AAEM wt % in latex | IPA Double Rubs @ 1 day | IPA Double Rubs @ 7 days | IPA Double Rubs @ 14 days |
|---|---|---|---|---|---|---|
| 11-1 | R5 | 8.11 | 0 | 99 | 151 | 302 |
| 11-2 | R6 | 0 | 11.4 | 70 | 99 | 109 |
| 11-3 | R10 | 0 | 4.6 | 48 | 51 | 53 |
| 11-4 | R8 | 0 | 3.6 | 52 | 60 | 82 |
| 11-5 | R11 | 0 | 3.6 | 41 | 43 | 44 |

Example 12. Effect of DAAM on Coating Chemical Resistance. Following the procedure of Example 11, the following dispersions/latexes were tested in coating applications for chemical resistance on CRS panels. See Table 15 for results.

TABLE 15

Effect of DAAM on Coating Chemical Resistance

| Example | Dispersion/Latex | DAAM wt % in latex | Mw (g/mol) | IPA Double Rubs @ 1 day | IPA Double Rubs @ 7 days | IPA Double Rubs @ 14 days |
|---|---|---|---|---|---|---|
| 12-1 | R5 | 8.11 | 4020 | 99 | 151 | 302 |
| 12-2 | 8-7 | 4.20 |  | 77 | 102 | 160 |
| 12-3 | R12 | 4.27 | 3500 | 68 | 102 | 155 |
| 12-4 | R7 | 4.20 | 7570 | 167 | 225 | 273 |
| 12-1 | R5 | 8.11 | 4020 | 99 | 151 | 302 |

Example 13. Effect of Epoxy Composition on Coating Chemical Resistance. Following the procedure of Example 11, the following resins were tested in coating applications for chemical resistance on CRS panels. See Table 16 for results.

TABLE 14

Effect of Epoxy Composition on Coating Chemical Resistance

| Composition | Test R5 | Test R3 |
|---|---|---|
| BisFDGE | 0 | 5.7 wt % |
| PEO(11)DGE | 10.6 wt % | 0 |
| C12/C14 GE | 9.5 wt % | 13.5 wt % |
| ADH* | 2.8 wt % | 2.7 wt % |
| IPA Double Rubs @ 1 Day | 99 | 128 |
| IPA Double Rubs @ 7 Days | 151 | 263 |
| IPA Double Rubs @ 14 Days | 302 | 445 |

*This level of ADH equates to 0.75 equivalents relative to ketone groups present in the resin dispersion.

Comparative Example 1. Resin Dispersion without Schiff-Base Self-Crosslinking Ability. Resin 1 (R1) is a polymer dispersion that was prepared by reacting PD1 with neopentyl diglycidyl ether (NPDGE) and C12-C14 mono glycidyl ether (C12/14GE) and Gamma-Glycidoxypropyltrimethoxysilane (GPTS). The dispersion was heated to 90° C. followed by addition of NPDGE. After 120 minutes ("min"), C12/C14GE and GPTS were added together and the reaction was continued for an additional 180 min after which the reaction mixture was cooled and filtered. The data for this comparative example is shown in Tables 4 &5. R1 is a resin dispersion microgel that has no functionality that will make it self-crosslinking via Schiff-Base formation.

Para. 1. A dispersion comprising:
a polymer having latent crosslinking functionality and comprising the reaction product of:
  a partially neutralized, acid-functional resin; and
  an epoxy; and
optionally, an effective amount of a crosslinking agent;
wherein:
  the partially neutralized, acid-functional resin comprises the reaction product of a mixture of:
    a first acid-functional resin with a base and a second acid-functional resin; or
    a first and a second acid-functional resin with a base;
  the first acid-functional resin is not the same as the second acid-functional resin;
  at least one of the acid functional resins comprises a further functional group capable of Schiff-Base crosslinking after film formation; and
  the dispersion is a single pack waterborne polymer dispersion.

Para. 2. The dispersion of Para. 1, wherein the polymer is a hyperbranched polymer.

Para. 3. The dispersion of Para. 1 or 2, wherein the base is $NH_3$, $NH_{3\,(aq)}$, NaOH, KOH, or a mixture of any two or more thereof.

Para. 4. The dispersion of any one of Paras. 1-3, wherein at least about 5 mol % of acid groups on the acid-functional resin are neutralized.

Para. 5. The dispersion of any one of Paras. 1-4, wherein from about 5 mol % to about 95 mol % of acid groups on the acid-functional resin are bonded to the epoxy.

Para. 6. The dispersion of any one of Paras. 1-5, wherein the first and second acid-functional resins are individually an acid functional acrylic resin, a styrene-acrylic resin, a non-acrylic acid functional resin, and a hybrid acrylic acid-functional resin.

Para. 7. The dispersion of Para. 6, wherein the first and second acid-functional resins individually comprise one or more polymerized monomers selected from the group consisting of 2-hydroxyethyl acrylate, 2-hydroxyethyl methacrylate, 2,3-hydroxypropyl acrylate, 2,3-hydroxypropyl methacrylate, 2,4-hydroxybutyl acrylate, 2,4-hydroxybutyl methacrylates, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate.

Para. 8. The dispersion of Para. 7, wherein the first and second acid-functional resins individually comprise one or more polymerized monomers selected from the group consisting of vinylbenzoic acid, crotonic acid, itaconic acid, sorbic acid, cinnamic acid, citraconic acid, chloroacrylic acid, mesaconic acid, maleic acid, fumaric acid, ethacrylic acid, acrylic acid, methacrylic acid, sodium-2-sulfoethyl acrylate, sodium N-(1,1-dimethyl-2-sulfoethyl)acrylamide, and 3-acrylamido-3-methylbutanoic acid.

Para. 9. The dispersion of any one of Paras. 1-8, wherein the epoxy comprises a plurality of epoxy groups.

Para. 10. The dispersion of any one of Paras. 1-9, wherein the epoxy comprises a polyepoxy-functional polymer, a monoepoxy-functional polymer, or a mixture of any two or more thereof.

Para. 11. The dispersion of Para. 10, comprising the polyepoxy-functional polymer, wherein the polyepoxy-functional polymer has an epoxy equivalent weight of about 100 grams/eq. to about 1000 grams/eq.

Para. 12. The dispersion of Para. 10, comprising the polyepoxy-functional polymer, wherein the polyepoxy-functional polymer comprises a glycidyl ester or ether polymer, a glycidyl amine polymer, a cyclohexanedimethanol diglycidyl ether polymer, a polypropylene oxide diglycidyl ether polymer, a bisphenol A diglycidyl ether polymer, a bisphenol F diglycidyl ether polymer, or a mixture of any two or more thereof.

Para. 13. The dispersion of Para. 10, comprising the monoepoxy-functional polymer, and the monoepoxy-functional polymer comprises a glycidyl ether polymer, a glycidyl ester polymer, a glycidyl amine polymer, a glycidyl ester polymer, or a mixture of any two or more thereof.

Para. 14. The dispersion of Para. 13, wherein the monoepoxy-functional polymer comprises a glycidyl methacrylate, a glycidyl ester of neodecanoic acid, a bisphenol A monoglycidyl ether, a 2-ethylhexyl glycidyl ether, or a mixture of any two or more thereof.

Para. 15. The dispersion of Para. 3, wherein the base is $NH_3$, or $NH_3$ $_{(aq)}$.

Para. 16. The dispersion of Para. 1 or 2, wherein the acid-functional resin comprises the polymerization product of a mixture of monomers comprising:
a styrenic monomer; and
a monomer of formula V, maleic anhydride, itaconic acid, an ester of itaconic acid, or a mixture of any two or more thereof;

wherein:

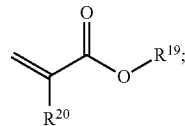

Formula V $R^{20}$ is hydrogen or $CH_3$; and
$R^{19}$ is a hydrogen, alkyl, cycloalkyl, aryl, or alkaryl.

Para. 17. The dispersion of Para. 16, wherein $R^{19}$ is a $C_1$-$C_{20}$ alkyl, a $C_3$-$C_{20}$ cycloalkyl, $C_5$-$C_{12}$ aryl, or a $C_5$-$C_{20}$ alkaryl.

Para. 18. The dispersion of Para. 16 or 17, wherein the acid-functional resin has a number average molecular weight ($M_n$) of about 1000 g/mol to about 30,000 g/mol.

Para. 19. The dispersion of Para. 18, wherein the acid-functional resin has a number average molecular weight ($M_n$) of about 2500 g/mol to about 20,000 g/mol.

Para. 20. The dispersion of any one of Paras. 1-19, wherein the polymer having latent crosslinking functionality has an acid number of about 15 mg KOH/g to about 300 mg KOH/g.

Para. 21. The dispersion of Para. 20, wherein the polymer having latent crosslinking functionality has an acid number of about 20 mg KOH/g to about 250 mg KOH/g.

Para. 22. The dispersion of any one of Paras. 1-21, wherein the polymer having latent crosslinking functionality is a microgel.

Para. 23. The dispersion of any one of Paras. 1-22, wherein the further functional group is a carbonyl group.

Para. 24. The dispersion of any one of Paras. 1-23, wherein the crosslinking agent is polyamines, a poly hydrazide, a hydrazine, or a mixture of any two or more thereof.

Para. 25. A printing ink, surface coating, or overprint varnish comprising the waterborne polymer dispersion of any one of Paras. 1-24.

Para. 26. A waterborne polymer dispersion comprising, based on the total solids weight in the polymer dispersion,
about 1 wt % to about 99 wt %, on a solids basis, of a non-self-crosslinkable waterborne polymer dispersion; and
about 99 wt % to about 1 wt %, on a solids basis, of a self-crosslinkable waterborne polymer dispersion comprising:
a polymer having latent crosslinking functionality and comprising the reaction product of:
a partially neutralized, acid-functional resin; and
an epoxy; and
optionally, an effective amount of a crosslinking agent;
wherein:
the partially neutralized, acid-functional resin comprises the reaction product of a mixture of:
a first acid-functional resin with a base and a second acid-functional resin; or
a first and a second acid-functional resin with a base;
the first acid-functional resin is not the same as the second acid-functional resin;
at least one of the acid functional resins comprises a further functional group capable of Schiff-Base crosslinking after film formation.

Para. 27. The waterborne polymer dispersion of Para. 26, wherein the polymer having latent crosslinking functionality is a hyperbranched polymer having latent crosslinking functionality.

Para. 28. The waterborne polymer dispersion of any one of Paras. 26-27, comprising: about 1 wt % to about 99 wt %, on a solids basis, of the self-crosslinkable waterborne polymer dispersion; and about 99 wt % to about 1 wt %, on a solids basis, of the non-self-crosslinkable waterborne polymer dispersion.

Para. 29. The waterborne polymer dispersion of any one of Paras. 26-28 comprising: about 20 wt % to about 80 wt %, on a solids basis, of the self-crosslinkable waterborne polymer dispersion; and about 80 wt % to about 20 wt %, on a solids basis, of the non-self-crosslinkable waterborne polymer dispersion.

Para. 30. The waterborne polymer dispersion of any one of Paras. 26-29 comprising: about 40 wt % to about 60 wt %, on a solids basis, of the self-crosslinkable waterborne polymer dispersion; and about 60 wt % to about 40 wt %, on a solids basis, of the non-self-crosslinkable waterborne polymer dispersion.

Para. 31. A waterborne polymer dispersion comprising a partially neutralized, acid functional latex and water;
wherein:
the partially neutralized, acid functional latex is the reaction product of an emulsion-polymerized reaction mixture and an epoxy compound; and
the emulsion-polymerized reaction mixture comprises:
about 1 wt % to about 25 wt % of a monomer having latent crosslinking functionality;
about 0.5 wt % to about 15 wt % of an acid functional monomer; and
about 60 wt % to about 98.5 wt % of at least one other copolymerizable monomer.

Para. 32. The waterborne polymer dispersion of Para. 31, wherein partially neutralized, acid functional latex is a microgel.

Para. 33. The waterborne polymer dispersion of any one of Paras. 31-32, wherein the latent crosslinking functionality comprises carbonyl groups.

Para. 34. The waterborne polymer dispersion of any one of Paras. 31-33 further comprising a crosslinking agent selected from the group consisting of polyamines, polyhydrazides, polyhydrazines, and a mixture of any two or more thereof.

Para. 35. The waterborne polymer dispersion of any one of Paras. 31-34, wherein the emulsion-polymerized reaction mixture is partially neutralized with $NH_3$, $NH_{3\ (aq)}$, NaOH, KOH, or a mixture of any two or more thereof.

Para. 36. The waterborne polymer dispersion of any one of Paras. 31-35, wherein at least about 5 mol % of the acid groups on the latex are neutralized.

Para. 37. The waterborne polymer dispersion of any one of Paras. 31-36, wherein up to about 95 mol % of the acid groups on the latex are bonded to the epoxy.

Para. 38. The waterborne polymer dispersion of any one of Paras. 31-37, wherein the latex comprises an acid functional acrylic resin, a styrene-acrylic resin, a non-acrylic acid functional resin, a hybrid acrylic acid-functional resin, or a mixture of any two or more thereof.

Para. 39. The waterborne polymer dispersion of any one of Paras. 31-38, wherein the latex comprises one or more copolymerizable monomers selected from the group consisting of 2-hydroxyethyl acrylate, 2-hydroxyethyl methacrylate, 2,3-hydroxypropyl acrylate, 2,3-hydroxypropyl methacrylate, 2,4-hydroxybutyl acrylate, 2,4-hydroxybutyl methacrylates, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate.

Para. 40. The waterborne polymer dispersion of any one of Paras. 31-39, wherein the acid-functional monomer is selected from the group consisting of vinylbenzoic acid, crotonic acid, itaconic acid, sorbic acid, cinnamic acid, citraconic acid, chloroacrylic acid, mesaconic acid, maleic acid, fumaric acid, ethacrylic acid, acrylic acid, methacrylic acid, sodium-2-sulfoethyl acrylate, sodium N-(1,1-dimethyl-2-sulfoethyl)acrylamide, and 3-acrylamido-3-methylbutanoic acid.

Para. 41. The waterborne polymer dispersion of any one of Paras. 31-40, wherein the epoxy comprises a polyepoxy-functional polymer, a monoepoxy-functional polymer, or a combination thereof.

Para. 42. The waterborne polymer dispersion of Para. 41, wherein the polyepoxy-functional polymer has an epoxy equivalent weight of about 100 grams/eq. to about 1000 grams/eq.

Para. 43. The waterborne polymer dispersion of Para. 41, comprising the polyepoxy-functional polymer, wherein the polyepoxy-functional polymer comprises a glycidyl ester or ether polymer, a glycidyl amine polymer, a cyclohexanedimethanol diglycidyl ether polymer, a polypropylene oxide diglycidyl ether polymer, a bisphenol A diglycidyl ether polymer, a bisphenol F diglycidyl ether polymer, or a mixture of any two or more thereof.

Para. 44. The waterborne polymer dispersion of Para. 41, comprising the monoepoxy-functional polymer, and the monoepoxy-functional polymer comprises a glycidyl ether polymer, a glycidyl ester polymer, a glycidyl amine polymer, a glycidyl ester polymer, or a mixture of any two or more thereof.

Para. 45. The waterborne polymer dispersion of Para. 44, wherein the monoepoxy-functional polymer comprises a glycidyl methacrylate, a glycidyl ester of neodecanoic acid, a bisphenol A monoglycidyl ether, a 2-ethylhexyl glycidyl ether, or a mixture of any two or more thereof.

Para. 46. The waterborne polymer dispersion of any one of Paras. 31-45, wherein the polymer dispersion is neutralized with ammonia.

Para. 47. The waterborne polymer dispersion of any one of Paras. 31-46, wherein the latex comprises the polymerization product of a mixture of monomers comprising:
a styrenic monomer; and
a monomer of formula V, maleic anhydride, itaconic acid, an ester of itaconic acid, or a mixture of any two or more thereof;
wherein:

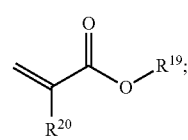

Formula V $R^{20}$ is hydrogen or $CH_3$; and
$R^{19}$ is a hydrogen, alkyl, cycloalkyl, aryl, or alkaryl.

Para. 48. The waterborne polymer dispersion of Para. 47, wherein $R^{19}$ is a $C_1$-$C_{20}$ alkyl, a $C_3$-$C_{20}$ cycloalkyl, $C_5$-$C_{12}$ aryl, or a $C_5$-$C_{20}$ alkaryl.

Para. 49. The waterborne polymer dispersion of any one of Paras. 31-48, wherein the latex has a number average molecular weight ($M_n$) of about 1000 g/mol to about 100,000 g/mol.

Para. 50. The waterborne polymer dispersion of any one of Paras. 31-49, wherein the latex has a number average molecular weight ($M_n$) of about 1000 g/mol to about 10,000 g/mol.

Para. 51. The waterborne polymer dispersion of any one of Paras. 31-50, wherein the latex has a number average molecular weight ($M_n$) of about 2500 g/mol up to about 20,000 g/mol.

Para. 52. The waterborne polymer dispersion of any one of Paras. 31-51, wherein the functionalized latex has an acid number of about 15 mg KOH/g to about 300 mg KOH/g.

Para. 53. The waterborne polymer dispersion of any one of Paras. 31-52, wherein the functionalized latex has an acid number of about 20 mg KOH/g to about 250 mg KOH/g.

Para. 54. A printing ink, surface coating, or overprint varnish comprising the waterborne polymer dispersion of any one of claims 31-53.

Para. 55. A waterborne polymer dispersion comprising, based on the total solids weight in the polymer dispersion;
  from about 1 wt % to about 99 wt % of a latent crosslinkable functionalized latex; and
  from about 99 wt % to about 1 wt % of a polymer having latent crosslinking functionality;
  wherein:
    the polymer having latent crosslinking functionality comprises the reaction product of:
      two or more acid-functional resins; and
      an epoxy;
    the polymer having latent crosslinking functionality comprises a functional group amenable to participate in Schiff-Base crosslinking after film formation;
    the latent crosslinkable functionalized latex comprises water and a partially neutralized, acid functional latex that is the reaction product of an emulsion-polymerized reaction mixture comprising:
      about 1 wt % to about 25 wt % of a monomer having latent crosslinking functionality;
      about 0.5 wt % to about 15 wt % of an acid functional monomer;
      an epoxy compound; and
      about 60 wt % to about 98.5 wt % of at least one other copolymerizable monomer.

Para. 56. The waterborne polymer dispersion of Para. 55, wherein the polymer having latent crosslinking functionality is a hyperbranched polymer having latent crosslinking functionality.

Para. 57. The waterborne polymer dispersion of Para. 55 or 56, wherein the latent crosslinkable functionalized latex comprises one or more polymerized acid functional monomers selected from the group consisting of vinylbenzoic acid, crotonic acid, itaconic acid, sorbic acid, cinnamic acid, citraconic acid, chloroacrylic acid, mesaconic acid, maleic acid, fumaric acid, ethacrylic acid, acrylic acid, methacrylic acid, sodium-2-sulfoethyl acrylate, sodium N-(1,1-dimethyl-2-sulfoethyl)acrylamide, and 3-acrylamido-3-methylbutanoic acid.

Para. 58. The waterborne polymer dispersion of Para. 55, 56, or 57 comprising a component from about 10 wt % to about 90 wt % of the latent cross linkable functionalized latex and from about 90 wt % to about 10 wt % of the polymer having latent crosslinking functionality.

Para. 59. The waterborne polymer dispersion of any one of Para. 55-58 comprising from about 20 wt % to about 80 wt % of the latent cross linkable functionalized latex and from about 80 wt % to about 20 wt % of the polymer having latent crosslinking functionality.

Para. 60. The waterborne polymer dispersion of Para. 55-59 comprising from about 40 wt % to about 60 wt % of the latent cross linkable functionalized latex and from about 60 wt % to about 40 wt % of the polymer having latent crosslinking functionality.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A dispersion comprising:
   a polymer being a hyperbranched polymer and having latent crosslinking functionality, which comprises the reaction product of:
      a partially neutralized, acid-functional resin; and
      an epoxy; and
   optionally, a crosslinking agent;
   wherein:
      the partially neutralized, acid-functional resin comprises the reaction product of a mixture of:
         a first acid-functional monomer with a base and a second acid-functional monomer; or
         both a first acid functional monomer and a second acid-functional monomer with a base;
      the first acid-functional monomer is not the same as the second acid-functional monomer;
      at least one of the acid functional monomer comprises a further functional group capable of Schiff-Base crosslinking after film formation; and
      the dispersion is a single pack waterborne polymer dispersion.

2. The dispersion of claim 1, wherein the base is $NH_3$, $NH_{3\,(aq)}$, NaOH, KOH, or a mixture of any two or more thereof.

3. The dispersion of claim 1, wherein at least about 5 mol % of acid groups on the acid-functional monomer are neutralized and about 5 mol % to about 95 mol % of acid groups on the acid-functional monomer are bonded to the epoxy.

4. The dispersion of claim 1, wherein partially neutralized, acid function resin is an acid functional acrylic resin, a styrene-acrylic resin, a non-acrylic acid functional resin, or a hybrid acrylic acid-functional resin.

5. The dispersion of claim 4, wherein the partially neutralized, acid-functional resin comprise one or more polymerized monomers selected from the group consisting of 2-hydroxyethyl acrylate, 2-hydroxyethyl methacrylate, 2, 3-hydroxypropyl acrylate, 2, 3-hydroxypropyl methacrylate, 2,4-hydroxybutyl acrylate, 2, 4-hydroxybutyl methacrylates, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate.

6. The dispersion of claim 5, wherein the the partially neutralized, acid-functional resin comprise one or more polymerized monomers selected from the group consisting of vinylbenzoic acid, crotonic acid, itaconic acid, sorbic acid, cinnamic acid, citraconic acid, chloroacrylic acid, mesaconic acid, maleic acid, fumaric acid, ethacrylic acid, acrylic acid, methacrylic acid, sodium-2-sulfoethyl acrylate, sodium N-(1,1-dimethyl-2-sulfoethyl) acrylamide, and 3-acrylamido-3-methylbutanoic acid.

7. The dispersion of claim 1, wherein the epoxy comprises a polyepoxy-functional polymer, a monoepoxy-functional polymer, or a mixture thereof and the polyepoxy-functional polymer has an epoxy equivalent weight of about 100 grams/eq. to about 1000 grams/eq.

8. The dispersion of claim 1, wherein the partially neutralized, acid-functional resin comprises the polymerization product of a mixture of monomers comprising:
   a styrenic monomer; and
   a monomer of formula V, maleic anhydride, itaconic acid, an ester of itaconic acid, or a mixture thereof;
wherein:

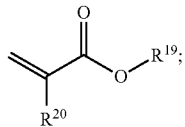

Formula V $R^{20}$ is hydrogen or $CH_3$; and
$R^{19}$ is a hydrogen, alkyl, cycloalkyl, aryl, or alkaryl.

9. The dispersion of claim 8, wherein the partially neutralized, acid-functional resin has a number average molecular weight ($M_n$) of about 1000 g/mol to about 20,000 g/mol and the polymer has an acid number of about 15 mg KOH/g to about 300 mg KOH/g.

10. The dispersion of claim 1, wherein the polymer is a microgel when the polymer comprises the crosslinking agent which is a polyamine, a poly hydrazide, a hydrazine, or a mixture of any two or more thereof.

11. The dispersion of claim 1, wherein the further functional group is a carbonyl group.

12. A waterborne polymer dispersion comprising, based on the total solids weight in the polymer dispersion,
   about 1 wt % to about 99 wt %, on a solids basis, of a non-self-crosslinkable waterborne polymer dispersion; and
   about 99 wt % to about 1 wt %, on a solids basis, of a self-crosslinkable waterborne polymer dispersion comprising:
      a polymer having latent crosslinking functionality and comprising the reaction product of:
         a partially neutralized, acid-functional resin; and
         an epoxy; and
      optionally, an effective amount of a crosslinking agent;
   wherein:
      the partially neutralized, acid-functional resin comprises the reaction product of a mixture of:
         a first acid-functional resin with a base and a second acid-functional resin; or
         a first and a second acid-functional resin with a base;
      the first acid-functional resin is not the same as the second acid-functional resin;

at least one of the acid functional resins comprises a further functional group capable of Schiff-Base crosslinking after film formation.

13. The dispersion of claim 12, wherein the polymer having latent crosslinking functionality is a hyperbranched polymer having latent crosslinking functionality.

14. The waterborne polymer dispersion of claim 12 comprising:
   about 40 wt % to about 60 wt %, on a solids basis, of the self-crosslinkable waterborne polymer dispersion; and
   about 60 wt % to about 40 wt %, on a solids basis, of the non-self-crosslinkable waterborne polymer dispersion.

\* \* \* \* \*